INVENTOR
BRUCE E. BRILEY
BY C. A. Gulbransen
ATTY.

June 4, 1968 B. E. BRILEY 3,387,279

MULTIAPERTURE MAGNETIC DISC COMPUTER CONTROL MEMBERS

Filed Sept. 7, 1965 12 Sheets-Sheet 5

June 4, 1968 B. E. BRILEY 3,387,279

MULTIAPERTURE MAGNETIC DISC COMPUTER CONTROL MEMBERS

Filed Sept. 7, 1965 12 Sheets-Sheet 7

June 4, 1968 B. E. BRILEY 3,387,279

MULTIAPERTURE MAGNETIC DISC COMPUTER CONTROL MEMBERS

Filed Sept. 7, 1965 12 Sheets-Sheet 8

June 4, 1968 B. E. BRILEY 3,387,279

MULTIAPERTURE MAGNETIC DISC COMPUTER CONTROL MEMBERS

Filed Sept. 7, 1965 12 Sheets-Sheet 12

United States Patent Office 3,387,279
Patented June 4, 1968

3,387,279
MULTIAPERTURE MAGNETIC DISC COMPUTER CONTROL MEMBERS

Bruce E. Briley, La Grange Park, Ill., assignor to Automatic Electric Laboratories, Inc., Northlake, Ill., a corporation of Delaware Filed Sept. 7, 1965, Ser. No. 485,153
10 Claims. (Cl. 340—172.5)

ABSTRACT OF THE DISCLOSURE

The control section of a digital computer employs modular construction wherein control pulse generators of the operational instructions are individually carried on separate plug-in circuit boards. Each of the control pulse generators comprises a myriaperture bistable magnetic disc and its associated driving circuit. The distribution of one or more windings through the apertures of the disc provide, upon magnetic switching of the disc, one or more series of pulses for controlling the operation of the computer.

Being a two-state device, the magnetic-disc, upon resetting, is also capable of generating pulses which are complements of the control pulses. Windings which are mirror windings of the control pulse windings and a rectifier are provided to take advantage of the complementary pulses and decrease the cycle time by converting them to usable control pulses. The correct current direction to provide setting or resetting is determined by a register which records the magnetic state of a disc.

There being no system clock, the operation is self-diagnostic upon an erroneous access of an empty instruction location, which is the same as a HALT instruction. Similarly, failure of an instruction circuit to generate control pulses will also stop the machine.

This invention relates to data processing machines and in particular to apparatus for controlling the operation of digital computers.

The central processors of conventional digital computers may be roughly divided into two sections, an arithmetic section which performs operations upon representations of numbers, and a control section which in general produces a sequential group of gating pulses devised to control the manipulations performed by the arithmetic section. The arithmetic section, because of its repetitive structure, lends itself to modularization. Further, the arithmetic section is relatively easy to design and diagnose. The control section, however, is unconventional in structure because an ensemble of special different logic arrangements are required for each construction. Therefore, modularization is practically impossible, and design and diagnosis are difficult.

An object of this invention is to provide a new and improved digital computer.

Another object of the invention is to provide a new and improved control unit for digital computers.

Another object of the invention is to provide a modular control unit for digital computers.

A further object of the invention is to provide a computer control arrangement which is self-diagnostic.

Still another object of the invention is to provide a digital computer which has the flexibility of being tailor made for any application without being a one-of-a-kind installation.

In conventional control units instructions are decoded to determine which of a prewired set of control pulses must be sent to the arithmetic unit. Additionally, the control unit performs certain housekeeping functions such as incrementing the instruction location counter which requires an internally used sequential set of gating pulses. In general, housekeeping functions are performed for all instructions, and therefore, housekeeping hardware is shared by all instructions. Similarly, like portions of the same instruction are often realized with the same piece of equipment. This design technique has an economical advantage in saving equipment costs; however, failure of a single element makes the machine subject to total failure. Furthermore, any afterthought of instruction change requires a soldering iron approach in a conventional totally wired-in control unit.

Microprogramming introduced a step forward in the computer art in increasing the flexibility of a machine. Generally, a microprogrammed control section utilizes a macroinstruction to address the first word of a series of microinstructions contained in an internal, necessarily fast, memory. The microinstructions are decoded to initiate the production of a sequential series of control pulses for the arithmetic section. The macroinstruction by nature could be very flexible; however, the microinstructions are permanently wired and thus limit the capabilities of the macroinstructions. Therefore, the same nonmodularizability exists as in the totally wired-in systems.

The present invention employs a new technique called picoprogramming. To better understand picoprogramming, one should refer to the United States patent application of B. E. Briley, entitled, Magnetic Memory Systems Employing Myriaperture Devices, Ser. No. 421,749, filed Dec. 21, 1964, and assigned to the same assignee as the present invention, which describes a myriaperture memory, which employs similar techniques in a memory application. Briefly, the myriaperture memory device is a two-state magnetic disc having a central aperture and a plurality of radially and annularly spaced apertures. Windings selectively thread these apertures to store data words. The words are read by driving the element with a current ramp which causes a flux change wave to propagate outwardly of the central aperture and switch the magnetic state outwardly from the center of the disc. The flux switching sequentially induces signals in the windings of the disc. In the memory field application various techniques were employed to convert the serially obtained data into a usable parallel form. By way of contrast, the present invention utilizes the natural propensity of a multiapertured disc to generate a sequence of pulses for controlling the operation of arithmetic apparatus. As will be understood from the instant disclosure the myriaperture device as a memory element has a much greater data character storage capacity than multiaperture device of the present invention has control character generating capacity due to the instant requirement for self-diagnostic circuitry.

A feature of the present invention resides in the utilization of a multiaperture disc as a sequential control pulse store and generator.

Another feature of the invention is the utilization of a winding on each multiaperture disc in a logic combination with the driving apparatus of the same disc to protect the drive circuitry from burn out.

Another feature of the invention resides in the provision of a flexible instruction schedule for a digital computer by employing plug-in circuit board techniques. Briefly, the control pulses for each instruction (i.e. ADD) are provided on the output windings of a disc; each disc being mounted on plug-in changeable circuit cards. Therefore, any number of combinations of instructions may be provided for a general purpose machine by simply changing the instruction cards. Thus, both the arithmetic section and the control section of the invention are modular.

Other objects and features of the invention not specifically set forth will become apparent and the invention will be best understood from the following description taken in conjunction with the accompanying drawings in which:

FIG. 1 is a block diagram representation of a digital computer according to the present invention;

FIGS. 2, 3 and 4 together form a schematic representation of FIG. 1 shown in greater detail to aid in describing the invention;

GENERAL DESCRIPTION

Figure 1:
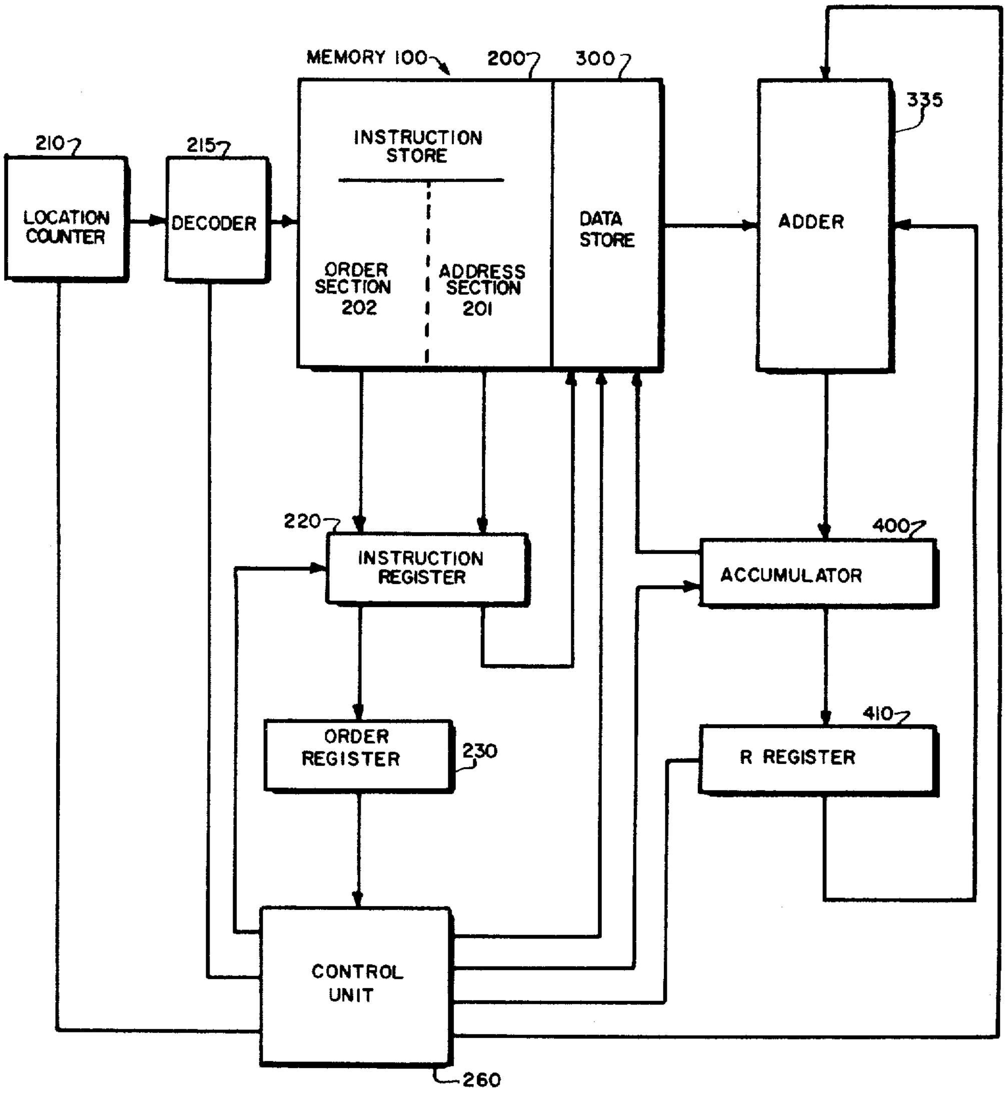

Referring to FIG. 1 a digital computer is described as comprising a memory including a data store 300, an instruction store 200 having an address section 201 for registering the address codes of data locations in the data store and an order section 202 for registering the manipulation codes to be performed on the addressed data, each of said order and address codes together forming an instruction code or operand. The computer further comprises an instruction location counter 210, a decoder 215 to select an operand, an instruction register 220 for registering selected operand, an accumulator 400 for registering the results of certain manipulations, an auxiliary or R register 410 for supplemental registering of data, and an adder 335 for performing numerical manipulations. Also provided is a control unit 260 as will be discussed in detail below.

Figure 2:
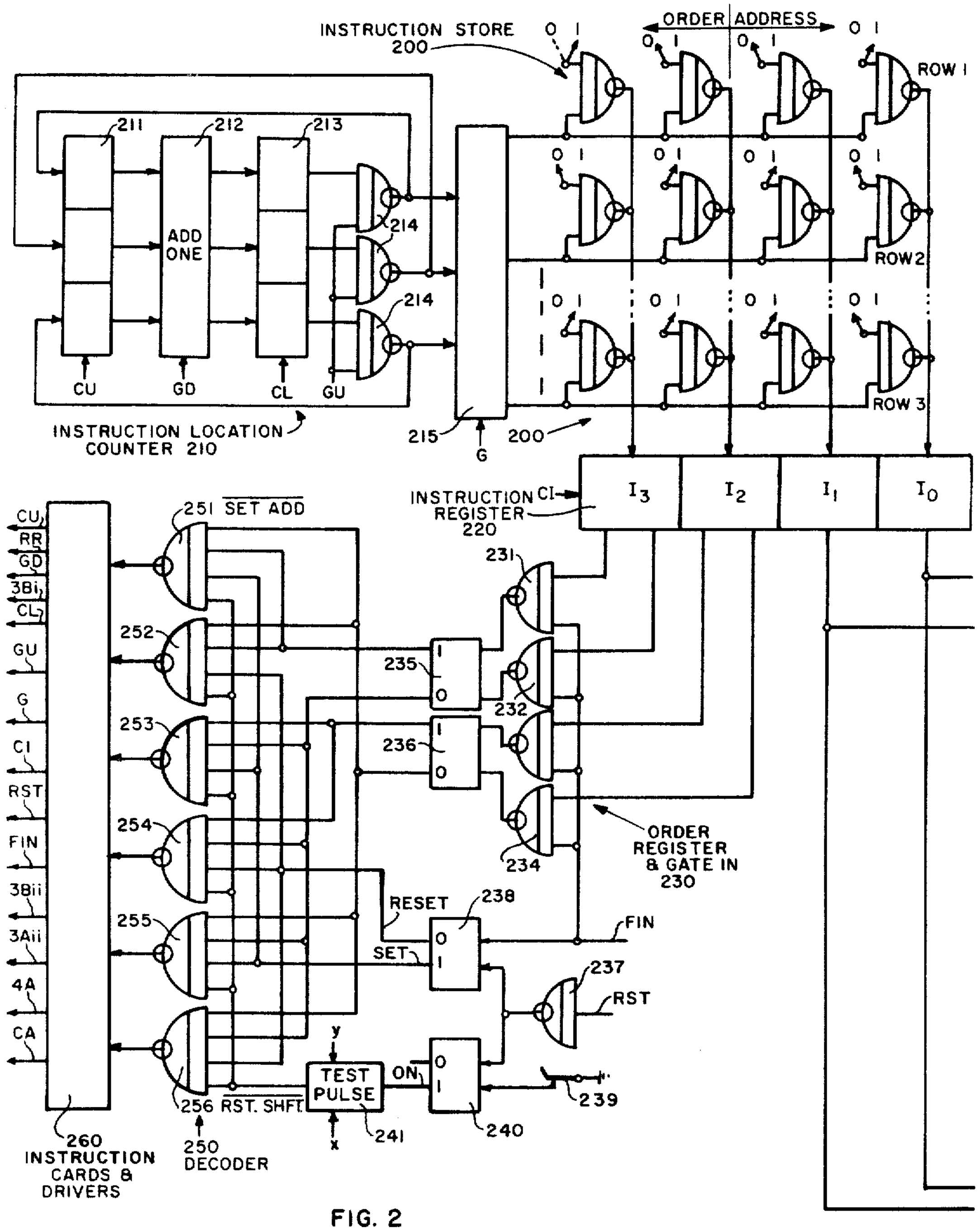
Figure 3:
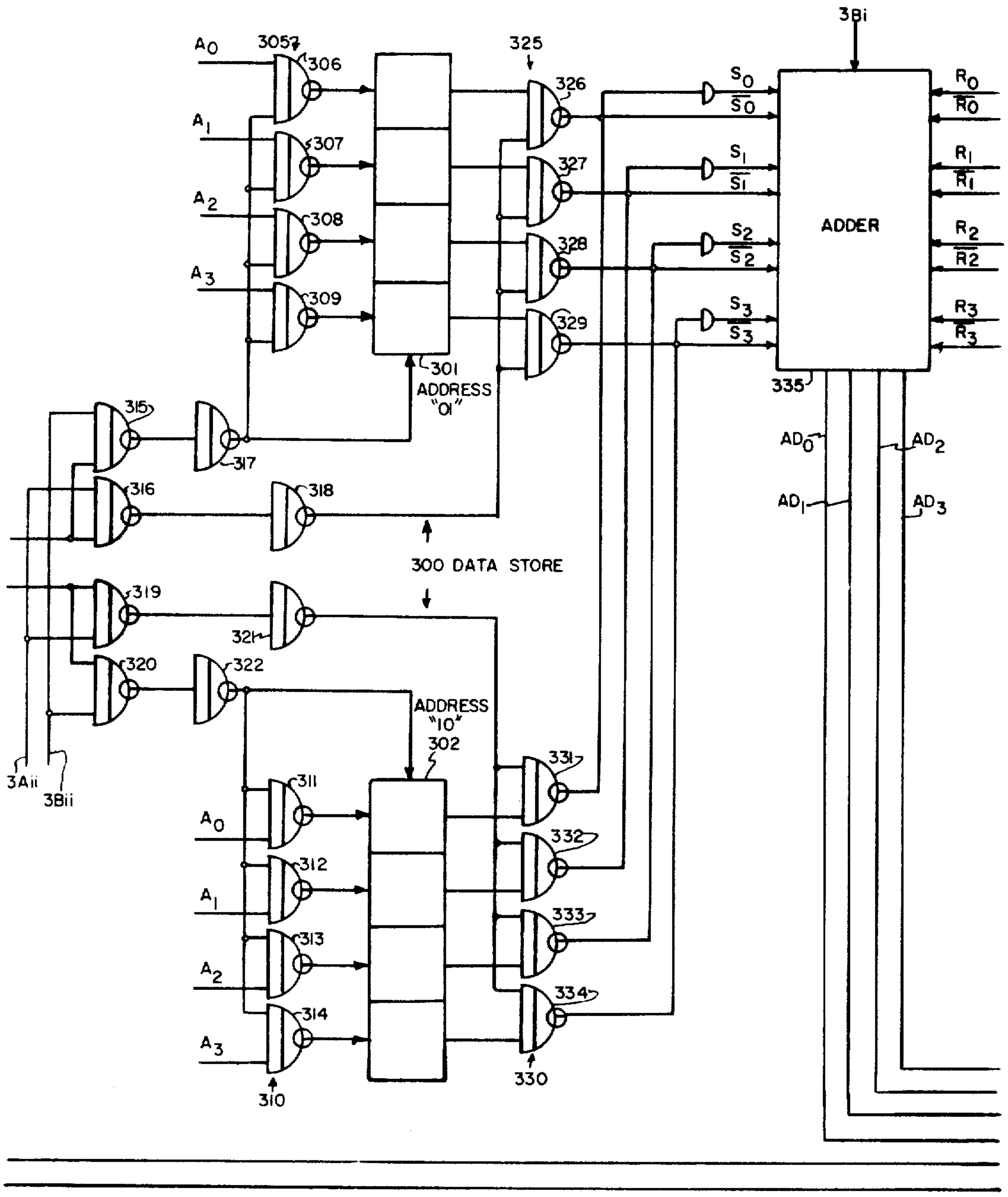
Figures 4, 16:
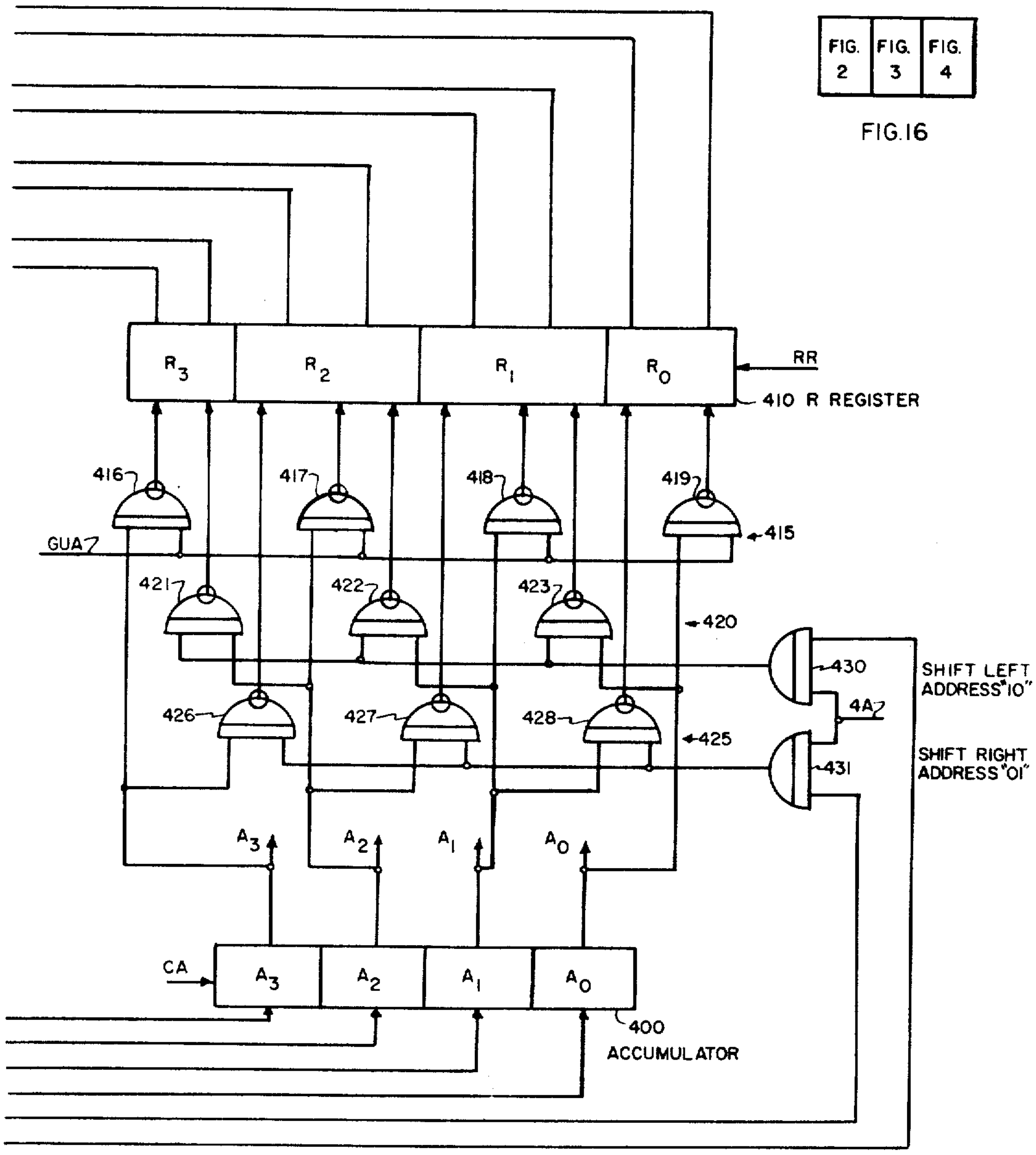
FIG. 16 is a diagram showing the orientation of FIGS. 2, 3 and 4.

FIGS. 2, 3 and 4 together describe the digital computer of FIG. 1 in greater detail. The instruction store 200 has been symbolized as a group of NAND gates which have common readout or sense conductors employing collector or negative OR logic as is well known in the art. Each NAND gate, for purpose of illustration, has a switch associated with an input thereof to manifest coded words. This portion of the memory would be advantageously realized by a semi-permanent memory, chosen in accordance with the frequency of instruction changes which may be expected. A card-changeable (mechanically alterable) twistor memory such as that described by W. A. Reimer and K. E. Krylow in United States patent application Magnetic Memory System and Solenoid Therefor, Serial No. 197,096, filed May 23, 1962, now United States Patent Number 3,218,615, issued November 16, 1965, and assigned to the same assignee as the present invention could be employed where instruction codes are changed on a weekly or monthly basis.

Data store 300, shown herein as an illustrative example only comprising two registers 301, 302, may be realized by any of the well known temporary type stores, perhaps the twistor or magnetic core varieties.

Figure 15:
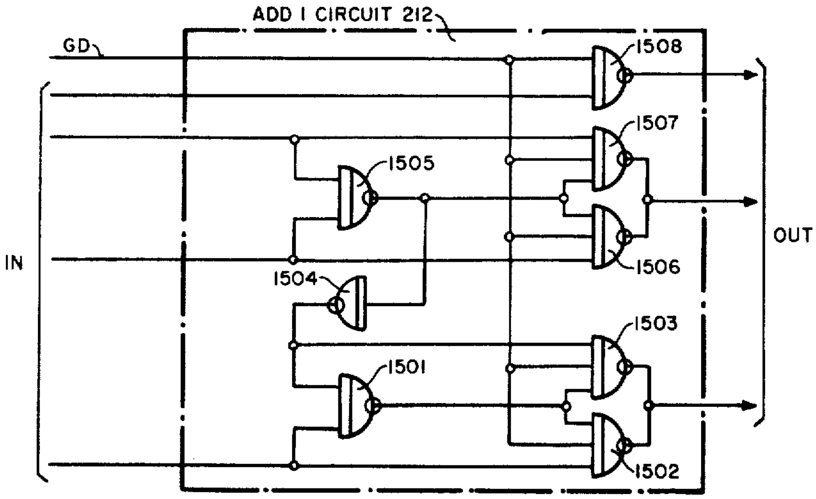

The instruction location counter 210 is comprised of conventional logic building blocks including a counter 213, gates 214, a count register 211 and an add one circuit 212 (see FIG. 15). The decoder 215 is of conventional design for decoding, upon receipt of a control pulse G, words of the instruction store (eight words in this illustrative embodiment).

The adder 335 (also see FIG. 14) is of conventional design and will be covered in more detail in the operational description.

All register-type equipment in an experimental model was realized by employing cross-coupled NAND gate flip-flop circuits and the operation will be discussed accordingly below; however, one skilled in the art may employ any of several register equipments in practicing the invention. Also, all flip-flops, whether used as logic or buffer arrangements, were realized by employing the cross-coupled NAND gate techniques.

Figure 5:
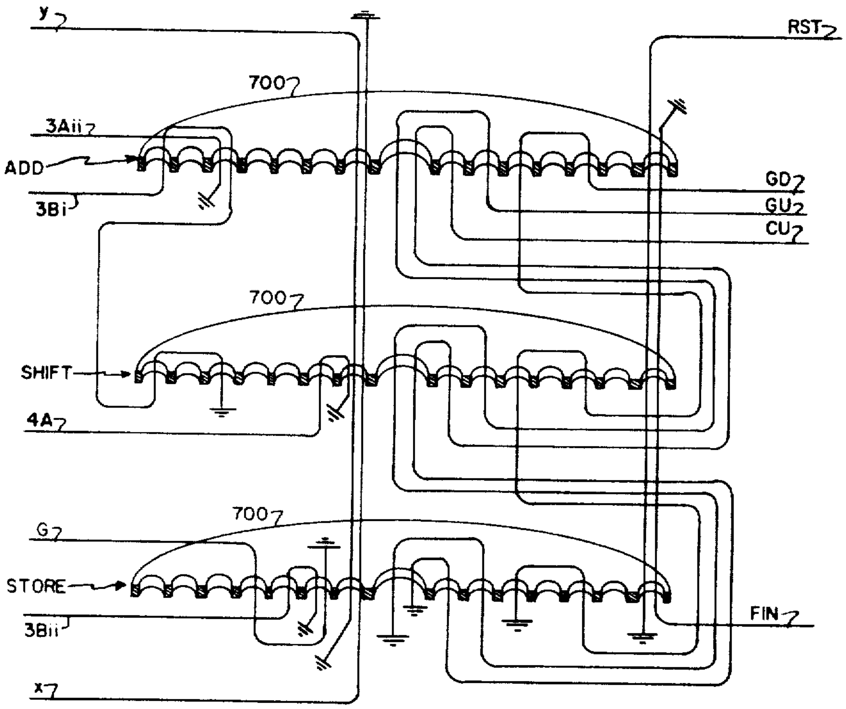
FIG. 5 is a schematic representation of the partially wired ADD, SHIFT and STORE instructions.
Figure 7:
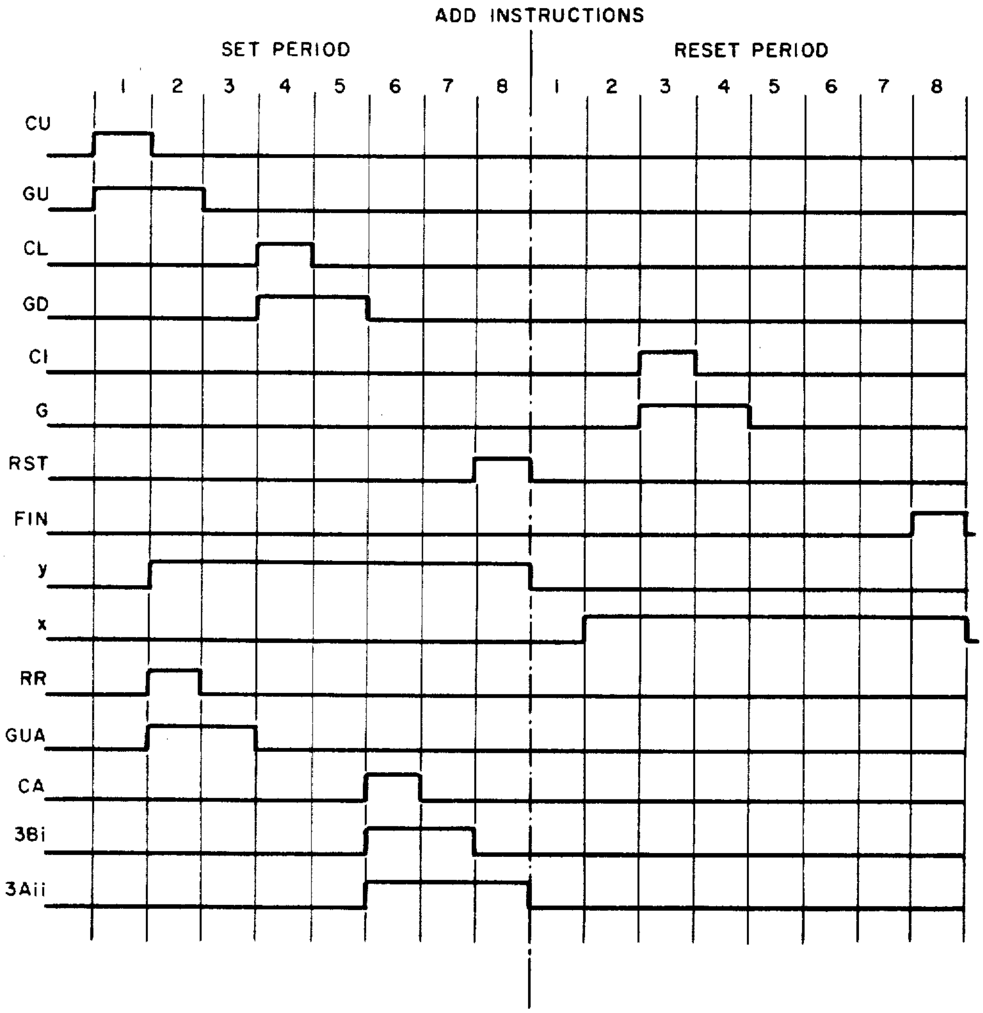
FIGS. 7–11 are timing diagrams of some instructions, and due to the nature of the multiaperture disc, are wiring diagrams of these instructions.
Figure 8:
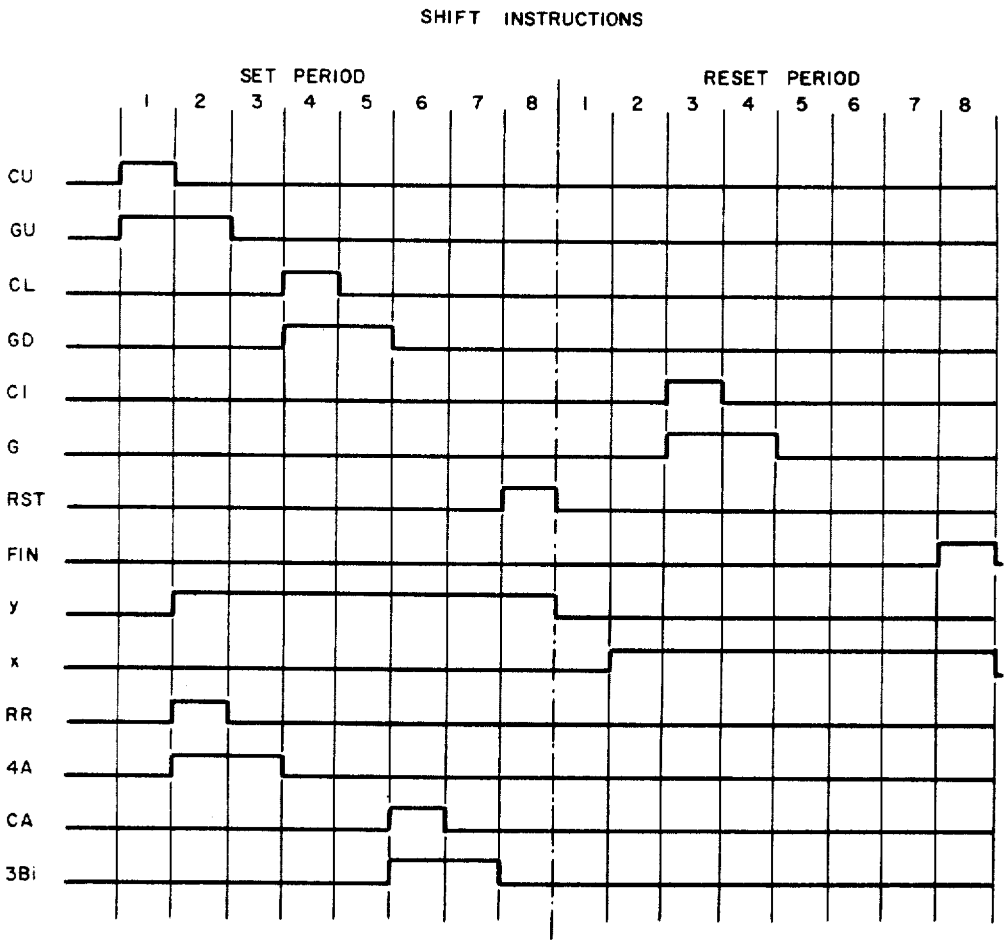
Figure 9:
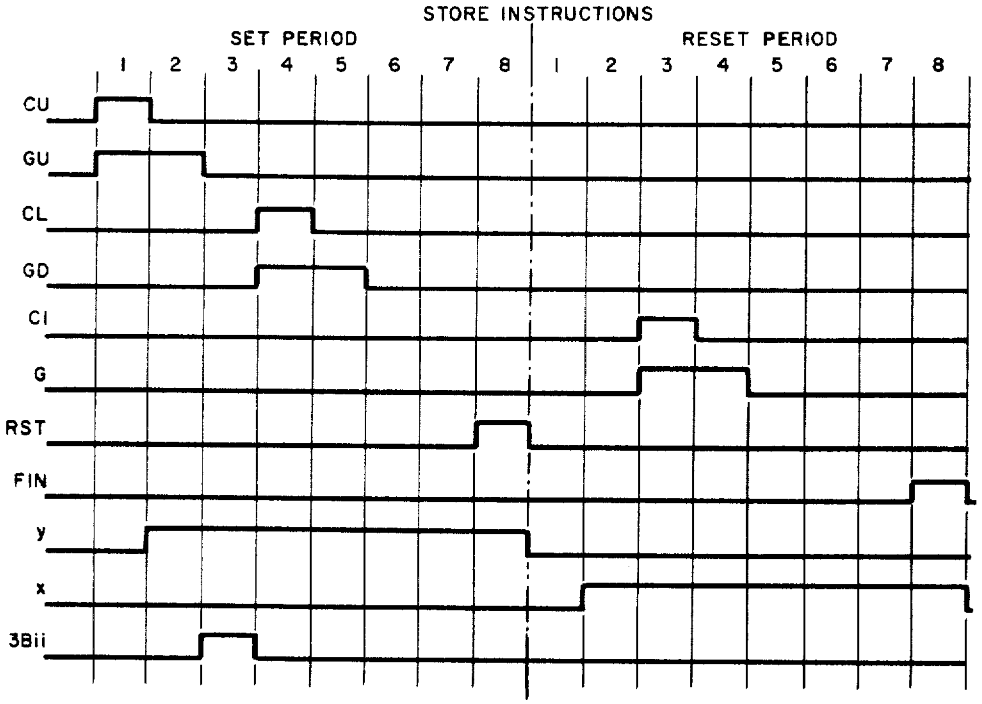

FIG. 5 shows the ADD, SHIFT, and STORE instructions partially wired. One can compare FIG. 5 with the diagrams of FIGS. 7, 8 and 9 and see that a timing diagram and a wiring diagram for a disc are one and the same.

Figure 6:
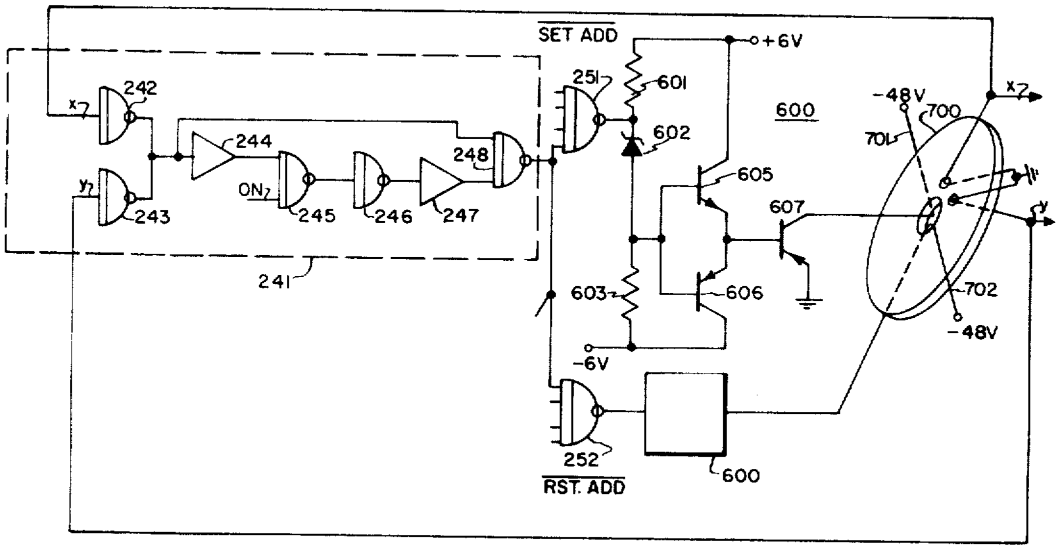
FIG. 6 is a schematic diagram showing the general driving configuration of a myriaperture disc according to the present invention.

FIG. 6 describes the decoding and driving apparatus for a MYRA disc. As will be seen in the operational description, apparatus 241 is a test pulse generating and delay arrangement used for testing the state of each disc. As an illustration, the decoding NAND gates 251, 252 for setting and resetting a disc are shown connected between circuit 241 and the driver circuits 600. It can be seen from the symbolic coupling to the MYRA disc that a $\overline{\text{SET ADD}}$ order and a $\overline{\text{RST ADD}}$ order provide opposite polarity magnetic fields for setting and resetting a disc.

FIGS. 7–11 describe timing and wiring diagrams for some discs. Time reads from left to right and is comprised of two groups of eight time positions for most discs. Spatial readings read left to right from the central aperture outward each time position being equal to a section between apertures. There are two spatial readings per disc (one for set, one for reset) each starting with position 1 and reading to the right. This time-space relationship provides an ease of slurring together of command signals into single wider pulses (i.e. GU, FIG. 7) and permits generation of a series set of overlapping pulses (i.e. GU, CU and RR, GUA of FIG. 7). The ability to generate such sequences without resorting to complex circuitry provides many advantages as will be seen below.

Since each disc effectively constitutes an autonomous generator, no clock is needed in a machine according to the present invention. Each disc, as it completes its switching causes the next instruction to be obeyed. Thus, the machine is not synchronous. On the other hand, it does not have the generally accepted earmarks of an asynchronous machine. Therefore, the term autochronous, or self-timed has been coined to describe this type of system.

Figure 12:
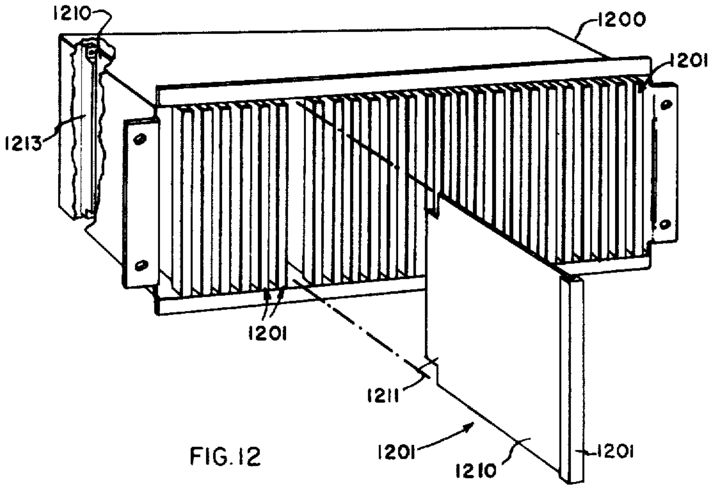
FIG. 12 is a pictorial representation of a digital computer which is completely modular in that the arithmetic unit and the control unit are made up of plug-in circuit cards of repetitive-type circuit structures.

FIG. 12 shows a modular computer arrangement comprising a plug-in type mounting unit 1200 for a digital computer. Circuit boards 1201 are plugged into the mounting unit connector 1213 and each carry portions of the arithmetic unit and the control unit. Basically the circuit boards have two portions, a mounting or terminal portion 1211 and a body portion 1210 for carrying electrical components.

Figure 13:
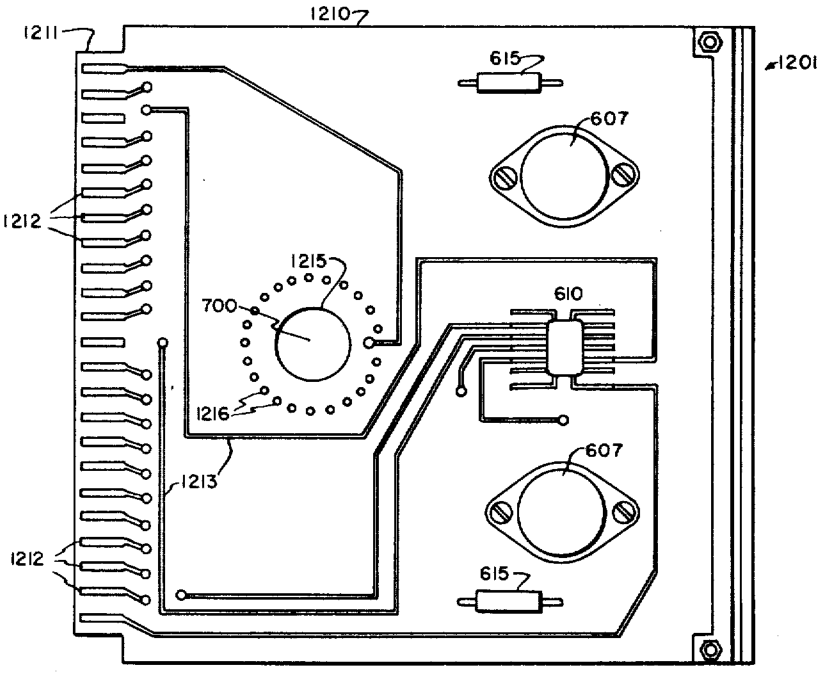
FIG. 13 is a pictorial representation of an instruction card which may be plugged into the chassis of FIG. 12.

FIG. 13 is a mere detailed view of a circuit card 1201. Portion 1211 carries the terminal connections 1212, for circuit conductors 1213, which may advantageously be of the printed wiring type. A multiaperture disc 700 is mounted in an aperture 1215 and electrical components 607, 610 and 615 are carried on the body portion 1210 of the circuit board. Pins 1216 serve to connect the windings (not shown) of the disc to the circuit conductors.

Figure 14:
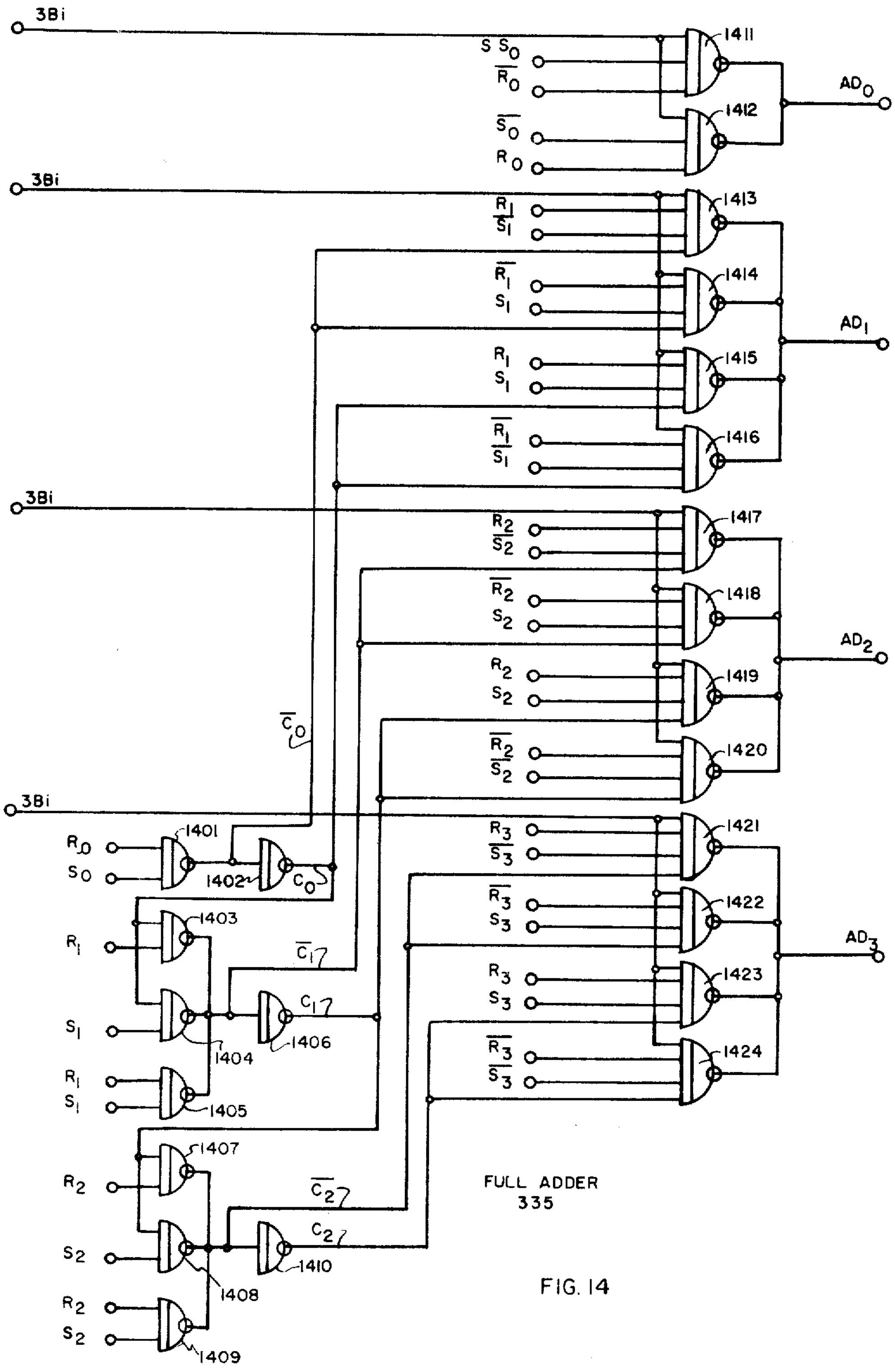
FIGS. 14 and 15 are schematic representations of a full adder and an add one circuit respectively, which were implemented in an experimental machine.

FIG. 14 shows a representation for a typical full adder arrangement which combines the inputs of $S_0$–$S_3$, $R_0$–$R_3$ and their complements to form the outputs $AD_0$–$AD_3$ upon the command pulse $3B_1$. Gates 1401 to 1424 provide an adder of NAND gates employing negative OR or collector logic techniques.

FIG. 15 shows a typical add one circuit comprising gates 1501 to 1508 which reads the output of register 211 and, upon command pulse $GD_1$ adds one to the previous count.

Figure 17:
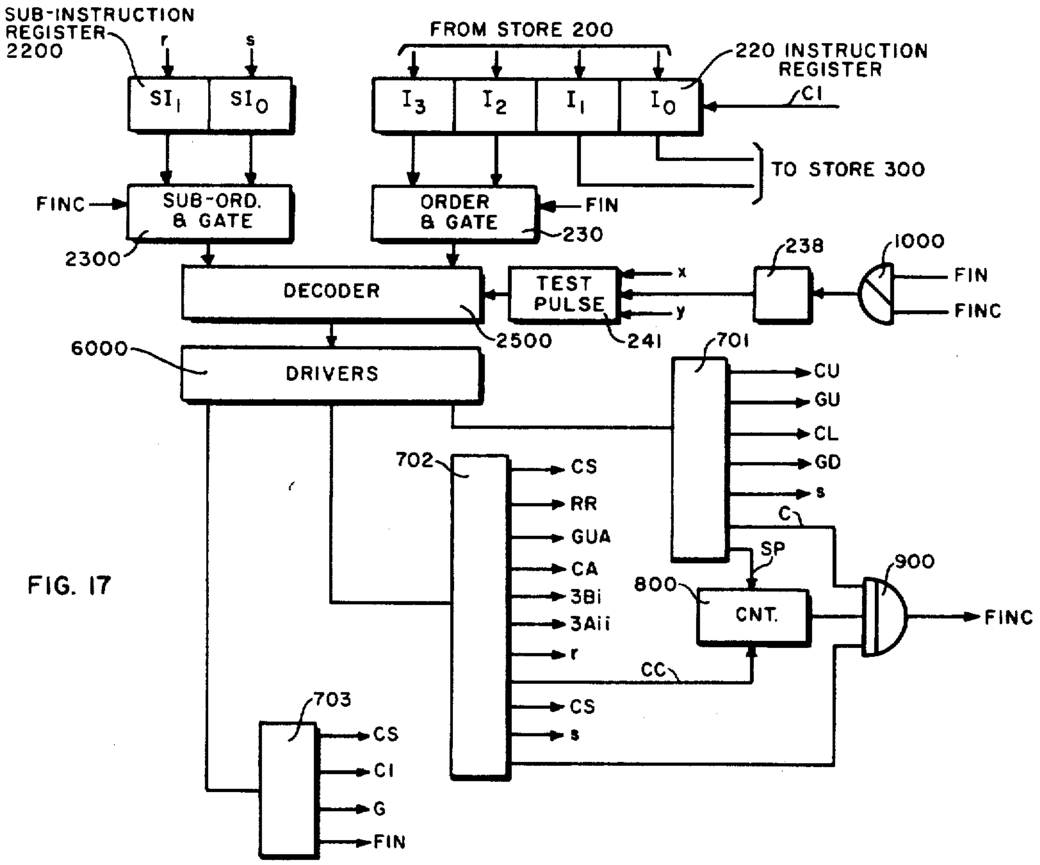
FIG. 17 is a schematic representation of cyclic instruction apparatus according to the present invention.

FIG. 17 describes in symbolic form an embodiment of the invention whereby cyclic instructions may be realized. In addition to the registers and gates of FIGS. 2 to 4, FIG. 17 describes the use of a sub-instruction register 2000, a sub-order register 2300, larger decoder 2500 and driver 6000 arrangements and circuit elements 800, 900 and 1000 for cycling certain instructions. One such instruction is realized by the use of discs 701 to 703. Other discs for single instructions and for other cyclic instructions would be driven by arrangement 6000, but are not shown in order to simplify the discussion below.

*Definitions.*—At this point it may be well to define some of the terms employed herein since some terms may be new, or generally used in a slightly different sense in the art and some may be used interchangeably.

Instruction Code—that data which is stored in the instruction store 200 portion of memory 100 in the form of a word having order bits and address bits.

Operand—same as an instruction.

Data Word—that data which is stored in the date store 300 portion of memory 100.

Order—that portion of an instruction code which defines the manipulation to be performed.

Address—that portion of an instruction code which defines the location of a word in the data store.

Instruction Card—a circuit board, advantageously of the plug-in type, which carries a coded MYRA disc.

Command (Command Pulse)—a control pulse produced by a multiaperture disc device to operate the various arithmetic and control equipment and associated apparatus. Gating into and out of a register and clearing a register result from the application of command pulses.

Instructions—a related group of commands for controlling a machine.

Race—a cyclic chain of events, which seem to have no end once the chain has begun.

OPERATIONAL DESCRIPTION

In the operation of the illustrative example, an operand is obtained from the instruction store and decoded to determine the order of a MYRA device and the address of a data word in the data store. The selected MYRA device produces command pulses to combine the selected data word with a stored quantity by means of some arithmetic manipulation. The MYRA device further increments the instruction location counter to a position in accordance with the next instruction required, and upon the generation of the last command (FIN), obtains the next operand from the instruction store.

*Driving MYRA devices.*—Referring to FIGS. 2 and 6, assume that the ADD function was obtained from the order portion of the instruction code. Decoding has therefore chosen gates 251 and 252; flip-flop 238 is set by the last previous FIN command such that gate 251 is the selected gate. Switch 239 (FIG. 2) is closed and buffer flip-flop 240 is set 1 to provide an input to gate 245. Gate 245 as yet has no input from gate 242, 243 and circuit 244; therefore, gates 245 and 246 furnish an input to energize pulse circuit 247 and gate 248 whereby a test pulse is gated through gate 251 to operate transistors 605, 606 and turn on transistor 607. Inputs $x$ and $y$ are sustaining commands from the disc and are not effective at the start of a driving so that the test pulse at the output of gate 248 comes from the expression $$[on\ (sus)_d]_d \qquad (1)$$

where *on* is the set 1 output of flip-flop 240, $\overline{x+y}=\overline{sus}$, $(sus)_d$ is the signal level at the output of circuit 244 which is a time delay between setting and resetting of a disc and between resetting of one disc and setting of the next accessed disc, and $d$ denotes time delays.

Transistor 607 has been saturated during the test pulse placing approximately ground potential at its collector; and therefore, effectively 48 volts across the set winding 701 of disc 700. If for some reason disc 700 is already in the set state, whereby it presents low impedance at winding 701, essentially all the voltage drop will be across the transistor 607. The short (i.e. 1 $\mu$sec.) test pulse prevents a sustained current flow at such a high voltage which would fry the transistor 607. If, however, the disc is in the reset state, such that a high impedance is presented at winding 701, approximately the entire supply voltage is presented as a step function across winding 701 and a ramp driving current is derived flowing from ground through the emitter of 607, the collector of 607, and the winding 701 to the supply terminal referenced $-48$ v.

The ramp current starts a flux wave propagation which nucleates from the central aperture toward the periphery of the disc 700 progressively switching the magnetic state from reset to set as it travels outward at a uniform velocity. Coupled near the central aperture are two windings $y$, $x$ for producing sustaining commands for setting and resetting respectively. The $x$ and $y$ commands are generated within the time duration of the test pulse and are applied to the associated inputs of gates 242 and 243, in this specific example $y$ command will be present at gate 243. A $y$ (or $x$) command provides a sustaining signal *sus* at the output of gate 248 to maintain the switching current for the disc. The output of gate 248 is therefore governed by the expression $$[on\ (sus)_d]_d + sus \qquad (2)$$

which, remembering negative OR logic or collector logic and expression (1), is an OR function of the commands $x$, $y$ and the set 1 of flip-flop 240.

At the end of the setting sequence, a command RST is generated which causes flip-flop 238 to be set 0 and switches the driving path from set gate 251 to reset gate 252 and the sequence is repeated employing an opposite polarity ramp current, an $x$ sustaining command, and an ending command FIN which causes flip-flop 238 to again be set 1.

A few of the instructions and manipulations will now be discussed in accordance with the following table.

TABLE I—Continued

| Order | Address | Function |
|---|---|---|

TABLE I

| Order | Address | Function |
|---|---|---|
| 00 | 00 | Halt. |
| 01 | 00 | Add zero to accumulator data. |
| 01 | 01 | Add contents of register 301 to accumulator data. |
| 01 | 11 | Add contents of registers 301 and 302 to accumulator data. |
| 01 | 10 | Add contents of register 302 to accumulator data. |
| 11 | 00 | Skip next instruction if accumulator is not zero. |
| 11 | 01 | Shift contents of accumulator one binary place to the right. |
| 11 | 11 | Shift right and left the contents of the accumulator. |
| 11 | 10 | Shift left the contents of the accumulator. |
| 10 | 00 | Store zero in accumulator. |
| 10 | 01 | Store contents of accumulator in register 301. |
| 10 | 11 | Store contents of accumulator in registers 301 and 302. |
| 10 | 10 | Store contents of accumulator in register 302. |

*Store instruction.*—As a place for starting the operation of the computer for the following illustrations assume that the decoder 215 has upon command G, effected readout of ROW 1 of the instruction store 200 into instruction register 220. Further assume that a disc is being reset and the command FIN is now being generated. In the above description of how the driving circuit operates it was explained that the FIN command started selection of a disc by causing flip-flop 238 to set 0 and determining if the set or reset gate (i.e. 251 or 252) would open. Command FIN has another important function which is closely related to setting flip-flop 238, namely gating out the order from the instruction register by way of gates 231–234 and setting flip-flops 235, 236 accordingly. For this particular instruction code (1001) gates 253 and 254 are selected, flip flop 238 making the final choice.

The disc associated with gates 253, 254 is driven with a setting ramp, then with a resetting ramp and controls the machine as follows.

Referring to FIGS. 2, 3, 4, 5 and 9, it can be seen that the first commands generated are CU and GU, which clear the auxiliary counting register 211 and gate the counting register 213 via gates 214 to select (but not read) the next instruction and to store the count in cleared register 211.

Next in sequence is generated the sustainer command *y* which maintains the disc drive.

Next pulse $3B_{11}$ is generated, and since in this example the address is 01, opens gates 315 and 317 to first clear register 301 and then gate the data of the accumulator into register 301 via gate-in circuit 305 comprising gates 306–309. Single-wire logic used to clear, then store, because of the short delay afforded by circuit 305.

Following pulse $3B_{11}$ pulses CL and GD are generated. CL clears the counting register 213, the count having been stored in register 211. GD is applied to gate the count down +1 in the add one circuit 212.

Pulse RST indicates that the disc has been set and may now be reset. RST operates flip-flop 238, as previously discussed, to switch from set gate 253 to reset gate 254.

The reset driver circuit operates and the first generated command is *y* to sustain driving.

Pulses CI and G are generated next in sequence. Pulse CI clears the present instruction code from instruction register 220 and G enables the decoder to read the next word (ROW 2) into register 220.

*Add instruction.*—The next coded instruction in ROW 2 is 0110 where order 01 is ADD and address 10 is register 302. Referring to FIGS. 2, 3, 4, 5, and 7, the code 0110 being already in register 220 due to command G of the disc of the previous instructions, command FIN (reset complete) gates order 01 into flip-flops 235, 236 and effects decoding in decoder 250 to select NAND gates 251, 252.

Test pulse and sustaining circuit 241 is operated via 251, 252 to set and reset the appropriate MYRA disc.

Again, pulse CU clears auxiliary counting register 211 and pulse GU gates the present count from register 213 to register 211 via gates 214.

Pulse *y* sustains setting of the disc, the test pulse being effectively extended by *y* in time duration.

Pulse RR and GUA are provided next. Pulse RR resets the R register 410 while GUA gates up data from accumulator 400 into the R rgeister 410 which in turn presents said data to the adder 335.

Pulses CL and GD are provided to clear counting register 213 and to add one to the count at circuit 212 and place the new count in register 213.

Next, three pulses are generated: pulse CA clears the accumulator 400; pulse $3B_1$ gates the adder 335 to the accumulator; and pulse $3A_{11}$ enters data from register 302 into the adder. Disappearancewise, CA leaves a free accumulator while $3B_1$ maintains an open path into the accumulator and $3A_{11}$ adds the previous accumulator data and the data from register 302.

Pulses CA, $3B_1$ and $3A_{11}$ are overlapped and staggered to prevent a "confused" accumulator and to prevent a race condition. Similar motives are involved for other staggered overlapping pulse patterns.

The last pulse during setting is of course RST which transfers the driving circuit to a reset condition including gate 252.

The first pulse during reset is *x*, sustain reset.

Pulses G and CI are next to gate the next instruction into a clear instruction register 220.

The last pulse is FIN to gate the next order for decoding and for placing the driving apparatus in a setting condition.

*Shift (left) instruction.*—Assume that we have progressed to where the information of ROW 8 is in the instruction register 220. ROW 8 is coded 1110 and has the order 11 meaning shift and the address 10, meaning left in the case of a shift instruction.

FIN from the last instruction has placed the circuits in the setting condition and circuit 241 furnished a test pulse for setting the appropriate disc.

Pulses CU and GU clear the auxiliary counting register 211 and gate the present count from register 213 to the register 211 via gates 214.

The sustainer *y* is generated and the disc continues setting.

Pulse RR resets the R register 410 and pulse 4A is combined with the address 10 to enable gate 430 which provides an input to the shift left gate arrangements 420. Gates 430 and 421 shift data of the $A_2$ section of the accumulator into the $R_3$ section of the R register. Gates 430 and 422 shift data of section $A_1$ into section $R_2$. Gates 430 and 423 shift data of section $A_0$ into section $R_1$.

A shift to the right would be similar using an address of 01 and gates 431, 426, 427 and 428.

Command CL clears the counting register and command pulse GD adds one to the present count and places the new count into the register 213.

Pulse RST denotes setting complete and transfers the drive decoding apparatus to the resetting condition.

Upon resetting, the sustainer *x* is generated first.

Other than the final command FIN only pulses CI and G are produced to gate a new instruction from the instruction store 200 into a clear register 220.

*Cyclic instructions.*—There is a class of instruction including MULTIPLY, DIVIDE and SHIFT N which may be classed as cyclic in the sense that the same sets of command pulses must be made available repetitively. These instructions may be handled most easily, but not necessarily by a set of three discs per instruction. The first ( Set Up) disc performs the set-up functions, indexing, fetching the operand, setting a permutation counter and addressing a second disc. The second (Cycler) disc performs a cycle of operation, as hereinbefore described, decrements the permutation counter and readdresses itself if the total instruction is not complete. After a specified number of cyclic operations the second disc access the third disc. The third (Clean Up) disc performs the remaining housekeeping functions such as clearing the instruction register and gating in a new instruction.

Referring to FIG. 17, a modification of FIG. 2 is seen wherein apparatus for a cyclic instruction has been provided in symbolic form as an illustration only since the cyclic instruction may be realized by a wide variety of apparatus. In this illustration assume that the instruction register 220 contains an order which when gated to the decoder 2500, says effectively ADD N times by accessing the set-up disc 701.

Upon FIN of the last previous instruction, the decoder 2500 and driver arrangement 6000 respond accordingly and operate disc 701 as previously described. Some of the pulses generated and a logical sequence of these pulses are as follows. Commands such as *x*, *y*, RST have been omitted from this example.

The Set-up disc 701 produces a series of pulses including CU, GU, CL, GD, *s*, SP and C.

Pulses CU, GU, CL and GD increment the instruction location counter 210 as previously described to prepare for the next instruction. Pulse *s* is employed to set the sub-instruction register 2200 to, in this case, 01, a suborder of disc 702. Pulse SP sets an associated permutation counter to a predetermined count of N cycles. Pulse C operates gate 900 to supply FINC which in turn gates the information 01 from register 2200 into the sub-order register 2300 and decoder 2500. Pulse FINC also effects operation of the test pulse circuit 241 to enable decoder 2500 and drivers 6000 to energize the cycler disc 702.

The cycler disc 702 generates pulses including CS, RR, GUA, CA, $3B_1$, $3A_{11}$, *r*, CC, CS again, *s* and RS. The first CS pulse clears the register 2200 in anticipation that any particular energization of disc 702 is the Nth energization of a cyclic instruction. Pulses RR, GUA, CA, $3B_1$ and $3A_{11}$ will be recognized as the command pulses which are unique to the ADD instruction above; therefore an addition of accumulator data and the data of the address in registers $I_0$, $I_1$ (register220) will occur. Next, an address pulse *r* is generated to prepare the register 2200 for addressing disc 703 by coding 10 therein. The counter 800 is decremented by CC and, if the count down had progressed to the last decrement, counter 800 enables gate 900 for signal FINC. If the energization is not the Nth time, FINC, is not produced. Code 10 (*r* set) is cleared by pulse CS and pulse *s* readdresses register 2200 to code 01, the cycler disc. Recycle pulse RC then provides FINC via gate 900 to redrive disc 702.

Upon reaching the last decrement of counter 800 due to CC pulses, FINC is furnished while register 2200 is still storing 10 (*r* set) and disc 703, the clean-up disc, is energized. Pulses CS, CI, G, and FIN are produced to clear registers 2200 and 220, gate the next instruction code into register 220 and initiate driving of the disc associated with the new instruction code.

*Halt instruction.*—The halt instruction is a special case since the order code therefor indicates an empty location. When an attempt is made to access an empty location, the machine quite literally ceases to operate since there is no system clock.

Figure 10:
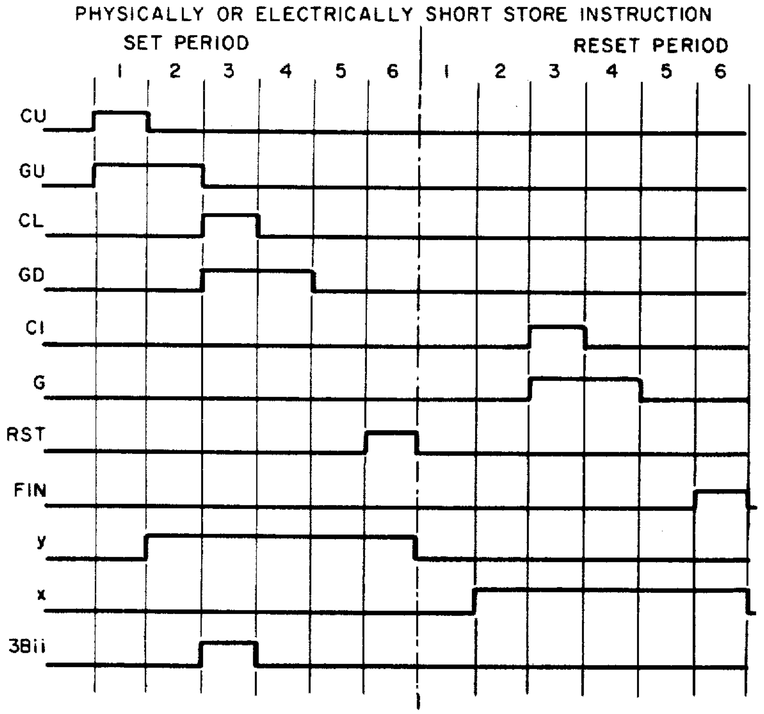
Figure 11:
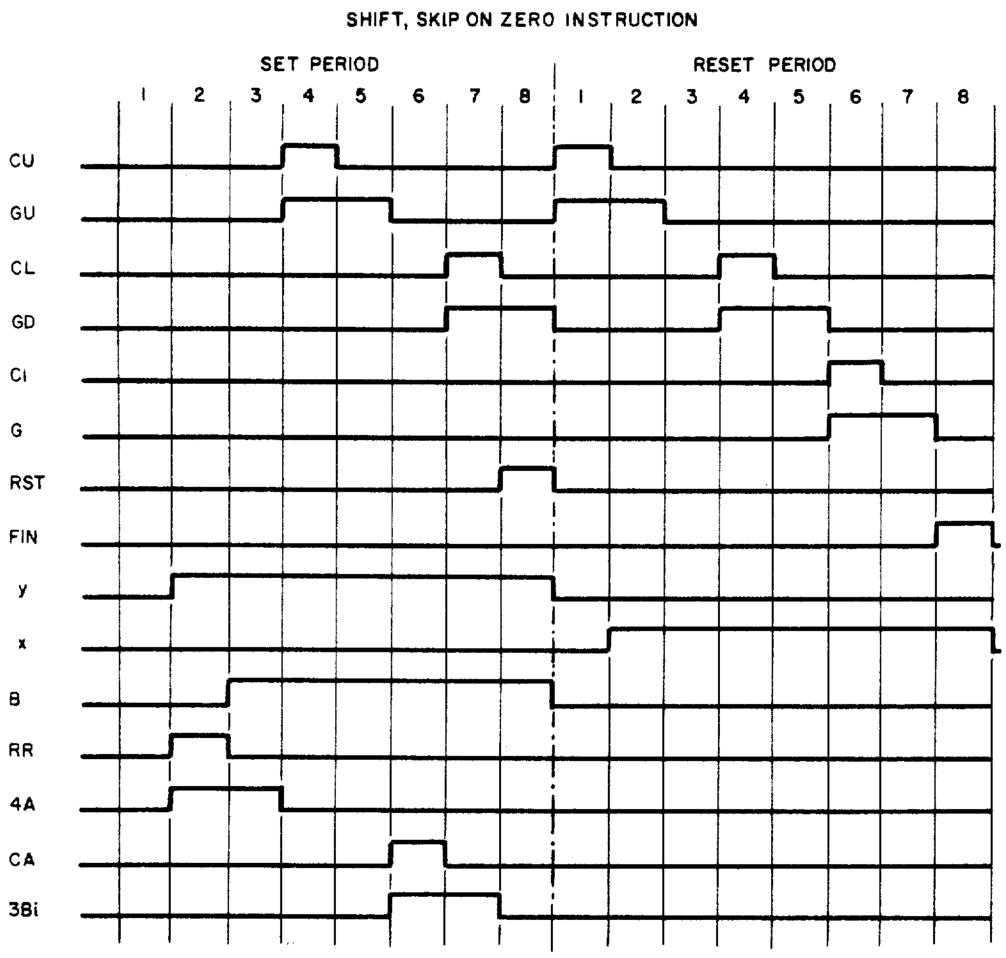

Some instructions may require a waiting period in the course of their execution, for example, fetching an operand from a memory. It is easy to accommodate such delays between the set and reset of a disc. Instructions also differ in their total execution time. While it is possible to force all instructions to occupy the same time interval, which would be dictated by the lengthiest, it is more efficient to allow differing execution times. This may be done by providing discs of differing physical or electrical dimensions. FIG. 10 describes a short dimension disc having six time positions instead of the eight which were otherwise disclosed.

As previously mentioned, the invention may take many modified forms, other than that specifically described, which will be evident to those skilled in the art without departing from the true spirit and scope of the invention and should be included in the appended claims.

What is claimed is:

1. Control apparatus for controlling the operation of arithmetic apparatus upon data stored in locations of a memory in response to the receipt of instruction codes, said control apparatus comprising:

control pulse generating means including a plurality of two-state magnetic discs each having a central aperture and a plurality of other apertures, a multiplicity of conductors selectively threading said apertures, a first group of said conductors connected to said arithmetic apparatus;

means for receiving instruction codes which comprise manipulation orders and addresses of locations in said memory;

address decoding means coupled to said receiving means and operated thereby to establish a data transfer path between said arithmetic apparatus and a selected memory location, a second group of said conductors connected to said address decoding means; and driver means coupled to said pulse generating means and to said receiving means, said driver means operated in response to a manipulation order to progressively reverse the magnetic state of a disc selected in accordance with said manipulation order and thereby energize said first and second groups of conductors with pulses for controlling the operation of said address decoding means and said arithmetic apparatus.

2. The control apparatus according to claim 1, comprising a mounting frame including electrical connector means, and a plurality of circuit boards, each of said circuit boards adapted to be plugged into said frame and each of said circuit boards carrying a separate one of said discs and the associated ones of said conductors which thread the apertures thereof, said associated ones of said conductors including electrical contact portions for mating with said electrical connector means.

3. The control apparatus according to claim 1, wherein certain ones of said control pulses are common to a plurality of instructions and wherein each conductor which carries one of said common control pulses threads each of said discs which provides such a pulse.

4. The control apparatus according to claim 1, wherein said driver means comprises:

a plurality of drivers, each of said drivers being individually coupled to a separate one of said discs;

means for selecting a driver in accordance with a manipulation order;

driver enabling means coupled to a third group of said conductors and operated by control signals thereon for enabling a selected driver for a time sufficient to switch only a portion of the associated disc; and another conductor connected to said driver enabling means and coupled to said portion, the last-mentioned conductor being energized upon magnetic switching of the associated disc to sustain operation of said driver enabling means until said disc is fully switched.

5. The apparatus according to claim 1, wherein said other apertures of each said disc are spaced along at least one radius, and wherein certain ones of said conductors pass through more than one of said apertures to provide sets of pulses which are of different generation times and different time durations.

6. The control apparatus according to claim 1, and further comprising a pair of status windings oppositely linked to each said disc near the edge thereof and coupled to said driver means, said status winding being energized by and upon completion of magnetic state reversals of said disc to condition said driver means for switching said disc toward the other magnetic state.

7. Control apparatus for controlling the operation of arithmetic apparatus upon data stored in instruction order code and a data address code, said control apparatus comprising:

control pulse generating means including first, second and third two-state magnetic discs, each of said discs having a central aperture and a plurality of other apertures therein, a plurality of conductors selectively threading said apertures;

means for receiving and decoding order codes, said order codes including sub-order codes;

means connected to said receiving and decoding means and operated in response to the receipt of a data address code therefrom to establish a data transfer path between said arithmetic apparatus and the data location in said memory which is defined by said address code;

first driving means connected to said receiving and decoding means and coupled to said first disc, said first driving means being operated in response to said cyclic instruction order to reverse the magnetic state of said first disc and provide control pulses on selected ones of said conductors which define a sub-order code of said second disc, said selected conductors being connected to said receiving and decoding means;

second driving means connected to said receiving and decoding means and coupled to said second disc, said second driving means being operated in response to said sub-order code thereof to reverse the magnetic state of said second disc and provide control pulses on other selected ones of said conductors, said control pulses defining the sub-order code of said second disc and a sub-order code for said third disc, said other selected conductors being connected to said receiving and decoding means;

counting means connected to said pulse generating means and to said receiving and decoding means for counting the number of cyclic operations of said second disc, said counting means being set to a predetermined number, and decremented upon each operation of said second disc; and third driving means connected to said receiving and decoding means and coupled to said third disc, said third driving means being operated in response to the combination of the sub-order code thereof and the complete decrementation of said counting means to reverse the magnetic state of said third disc and thereby provide control pulses on its associated conductors;

a group of said conductors being connected to said arithmetic apparatus for providing controlling pulses thereto.

8. In a digital computer including a memory for storing data, instruction orders and addresses of said data, and arithmetic apparatus for performing manipulations of said data in accordance with unique sets of control signals, a computer control arrangement comprising:

a plurality of two-state magnetic discs, each said disc having a central aperture and a plurality of other apertures;

a plurality of control conductors selectively threading said apertures and energized to provide control signals upon magnetic reversals of a disc;

means connected to said memory and to one of said control conductors and operated by a control signal thereon to read an instruction order and a data address from said memory;

driver means coupled to said discs to reverse the magnetic states thereof;

means connected to a first group of said conductors and coupled to said memory to decode a read instruction order and operate said driver means in accordance with said order; and means connected to a second group of said conductors and coupled to said memory to decode a read data address for transferring data between said memory and said arithmetic apparatus, a third group of said conductors for carrying said unique sets of control signals being connected to said arithmetic section.

9. An arrangement for driving a two state magnetic disc having a central aperture and a plurality of other apertures, said arrangement comprising:

driving means including an input circuit and an output circuit, said output circuit coupled to said disc, said driving means operated to switch the magnetic condition of said disc toward a first of said two states progressively outward of the central aperture for a time sufficient to switch only a portion of said disc; and first conductor means linking said portion of said disc and connected to said input circuit of said driving means, said first conductor means being energized by said magnetic switching with a signal to sustain operation of said driving means until the magnetic condition of said disc reaches said first state only if said disc is initially in the other of said two magnetic states.

10. The arrangement according to claim 9, wherein said driving means is selectively operable to progressively switch said disc toward either of said two magnetic states, and further comprising second conductor means linking said portion and energized upon the magnetic switching of said disc toward said other magnetic state, and ORing means included in said input circuit and connected to said first and second conductor means, said ORing means being operated in response to the energization of either of said conductor means to sustain the operation of said driving means.

References Cited

UNITED STATES PATENTS

| | | | |
|---|---|---|---|
| 3,182,297 | 5/1965 | Newhall | 340—174 |
| 3,225,333 | 12/1965 | Vinal | 340—172.5 |
| 3,298,004 | 1/1967 | Smith. | |

OTHER REFERENCES

Digital Equipment Corporation, Digital Modules, 1962, p. 51.

I.B.M. Technical Disclosure Bulletin, vol. 1, No. 2, August 1958, p. 33.

ROBERT C. BAILEY, *Primary Examiner.*

P. R. WOODS, *Assistant Examiner.*